Aug. 12, 1969 J. GAMMEL 3,461,398

CIRCUIT ARRANGEMENT FOR THE REDUCTION OF INTERFERENCE
PHASE MODULATION OCCURRING IN TRANSISTOR
LIMITING STAGES BY AMPLITUDE-MODULATED
FREQUENCY MODULATION

Filed Aug. 16, 1965

INVENTOR

*Josef Gammel*

BY *[signature]*

ATTYS.

United States Patent Office 3,461,398

Patented Aug. 12, 1969

3,461,398

CIRCUIT ARRANGEMENT FOR THE REDUCTION OF INTERFERENCE PHASE MODULATION OCCURRING IN TRANSISTOR LIMITING STAGES BY AMPLITUDE - MODULATED FREQUENCY MODULATION

Josef Gammel, Munich, Germany, assignor to Siemens Aktiengesellschaft, a corporation of Germany Filed Aug. 16, 1965, Ser. No. 479,948
Int. Cl. H03f 1/38, 3/04
U.S. Cl. 330—165 5 Claims

ABSTRACT OF THE DISCLOSURE

A transistor amplifier for frequency-modulated signals having stages operating from a predetermined control level or limiter for reducing the interference phase modulation which is coupled between stages with transformers. The transformers are of the type having extremely low leakage inductance. An alternating current positive feedback is connected between the secondary winding of a coupling transformer back to the input of the transistor amplifier.

The invention relates to a multistage transistor amplifier for frequency modulated signals, preferably for a narrow band directional radio installation, whose individual linear amplifier stages, connected in series by means of transformers, are preferably base circuited and operate in each case from a given control level as a limiter.

Amplifiers for receivers of angle-modulated signals, namely frequency- or phase-modulated signals, for example, for narrow band directional radio systems are subject to great fluctuations in the input field strength, especially in mobile use. There, the field strength fluctuations, occurring in superheterodyne receivers, are generally eliminated by amplitude limiters in an intermediate frequency amplifier.

For this purpose it is recommended that the amplifier not be provided with a large number of separate limiters, but be built up of individual linear amplifier stages connected in series, each of which operates from a predetermined control level as a limiter.

As extensive investigations have revealed, especially in apparatus with very high selectivity, in multi-stage transistor amplifiers there becomes apparent the difficulty, heretofore not pronounced to this degree, that in adjoining limiting amplifier stages the frequency modulated signal, as a result of a selectivity conditioned amplitude modulation of the FM signal, is subjected to a troublesome phase modulation, designated in the following as interference phase modulation.

The invention has, among others, the problem of eliminating this interference phase modulation.

This is achieved according to the invention in a multistage transistor amplifier for frequency-modulated signals, preferably for a narrow band directional radio installation, whose individual linear amplifier stages, connected in series by means of transformers, are base circuited and operate in each case from a given control level as a limiter, by the method that the transformers are constructed with extremely low stray inductance, and/or that from the secondary winding of the transformer to the emitter of the transistor feeding the transformer there is provided an additional alternating current coupling stabilizing the input resistance of such transistor for the operating frequencies, which is of such high value that it raises, prior to limiting action, the input resistance to the value occurring upon limitation, with a resistor, preferably having a lower resistance than the input resistance of the transistor, being arranged between the emitter and the base of the transistor, to prevent any oscillation tendency.

The transformers respectively coupling two transistor stages are expediently constructed with very low stray inductance by the method that the secondary winding is formed as strips of conductive material, such as, for example, copper, and are enclosed by the primary winding. Furthermore, the primary winding, at least on one of the sides away from the secondary winding, is provided with another strip of conductive material, such as, for example, copper or aluminum, acting as a field displacer, with avoidance of a short-circuiting ring formation.

The invention is based on the concept that the input resistance of the transistor, particularly in base circuit, but also in emitter circuit, rises from a few ohms, for example about 10 ohms, in normal operation to a considerably higher value of about 25 to 50 ohms (base circuit), and that through the stray inductance of the transformer and the transistor input resistance, a voltage divider is formed which, in dependence on the change of the transistor input resistance, undesirably and interferingly alters the phase of the applied voltage, if the latter is amplitude-modulated.

With the aid of examples of construction the invention is explained in detail in the following.

Figure 1:
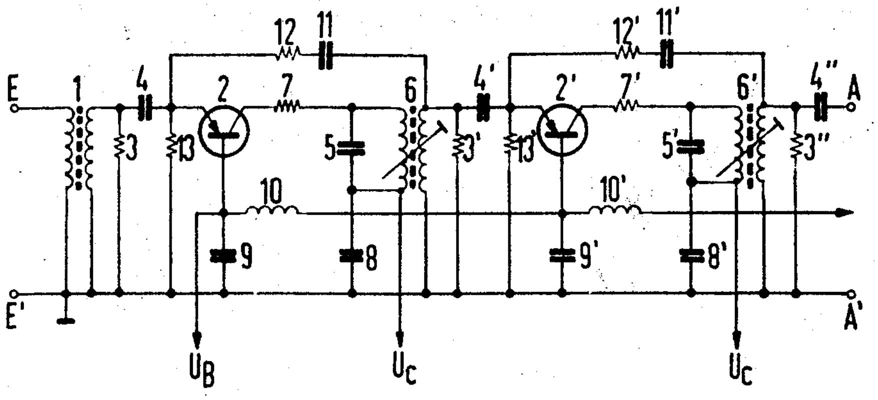
FIG. 1 is a circuit diagram illustrating a transistor amplifier embodying the invention.

FIG. 1 illustrates two stages of a multistage transistor amplifier, in which, from the input terminals E and E′ the signal is coupled over the input transformer 1 to the first amplifier stage having the transistor 2 arranged in base circuit. Parallel to the secondary winding of transformer 1 there is arranged an attenuating resistor 3, and there follows, in transmission direction, a coupling capacitor 4 which conducts the signal to the emitter of transistor 2. The collector voltage $U_C$ is supplied to the transistor 2 over the primary winding of the transformer 6, which, with the capacitor 5, forms an oscillatory circuit, and over the collector resistor 7. The collector voltage $U_C$ is blocked with respect to reference potential by the capacitor 8. To the base of transistor 2 there is supplied the base voltage $U_B$, which is blocked with respect to reference potential by the capacitor 9. The supplying of the subsequent transistor 2′ in transmission direction is effected over the choke 10. From the secondary winding of the transformer 6 there leads a co-coupling path over the capacitor 11 and the resistor 12 to the emitter of the transistor 2, with the resistor 13, extending parallel to the transistor input. The capacitor 11 and resistor 12 form an alternating current positive feedback path. Coupled over the transformer 6 is a second stage, whose elements correspond to the first described stage and, for distinction, are provided, with a prime. Upon the transformer 6′ there may follow a third and further stages.

The frequency-modulated intermediate frequency signal, which is subject to great fluctuations in input field strength, especially in mobile use, after passage through a relatively low amplifying first part (as viewed from the mixing stage output) or the intermediate frequency amplifier with a very high selectivity is conducted over this multistage transistor amplifier of considerably higher amplification with very low selectivity whose linear amplifier stages connected in series by means of transformers operated in each case from a given modulation level as limiter, in order to again suppress the amplitude modulation occasioned by the selectivity.

The construction of the transformers 6, 6' which is explained in detail in the following, is particularly important with respect to extremely small stray inductance. It has been proven that without the special design of the individual transformers, a non-linear distortion factor of second degree becomes troublesomely apparent, as a result of the amplitude limitation occurring in at least one of the transistors of this amplifier portion.

Figure 2:
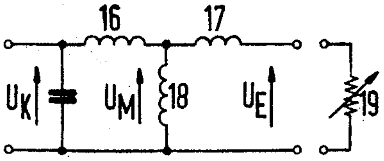
FIG. 2 is an equivalent circuit diagram of a transformer.

FIG. 2 presents the equivalent circuit diagram transformer 6 with the stray inductances 16 ($L_{S1}$) and 17 ($L_{S2}$) and the coupling inductance 18 ($L_M$). It will be apparent therefrom that if the input resistance 19 ($R_e$) of the subsequent transistor 2' takes on the order of magnitude of $j\omega L_{S2}$ and $j\omega L_M$, the phase positions of the voltages $U_K$, $U_M$ and $U_E$ no longer agree among one another, and that on a change of the transistor input resistance $R_e$ the relative phase positions of these voltages change with respect to each other. Since, however, these input resistance changes take place simultaneously with the amplitude change of the frequency-modulated signal, there results a considerable interference phase-modulation of the frequency-modulated signal. This phase-modulation can, however, be considerably reduced if the construction of the transformer 6 is carried out according to the invention for the great reduction of the stray inductances 16, 17.

Figure 3:
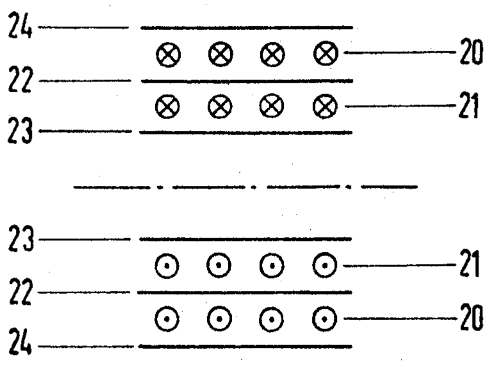
FIG. 3 is a transverse sectional view through the windings of a transformer constructed according to the invention.

For the reduction of the stray inductances the winding of the transformer is accomplished according to the diagram of FIG. 3, in which there is represented, the omission of the iron core, a section through the winding perpendicularly to the winding conductors. The primary side consists of two windings 20 and 21 connected in parallel in the same direction, between which there is disposed the secondary winding 22 in the form of a copper foil. As field displacer for the achievement of small stray inductances, additional foil strips 23 and 24, of copper, surround the exterior and interior of the assembly of primary and secondary windings, which, for the avoidance of a short-circuit formation are so constructed that the foil beginning and end overlap with an interlay of an insulating foil.

For the further reduction of the phase modulation arising from the still remaining stray inductances there is provided an additional coupling for the operating frequency, which extends from the secondary winding of the transformer 6 over the capacitor 11 and the resistor 12 to the emitter of transistor 2 and brings about, prior to commencement of limitation, a raising of the transistor input resistance $R_e$ to the value occurring on limitation. The oscillation tendency of the amplifier is reduced by a resistor 13, whose resistance value is selected considerably lower than the value of the transistor input resistance $R_e$ present in the additional coupling, to an uncritical value. Expediently the value of this additional resistor is so determined that the input resistance of the transistor thereby corresponds in effect, to its input resistance in the absence of the additional coupling.

Utilization of the invention proves especially advantageous, for example, in an amplifier in a narrow-band FM directional radio system, in which operating stages often result which make necessary a high selectivity. There thus results the requirement to provide in the receiver a filter device with a band width which narrows the FM signal spectrum to such a high degree that a considerable amplitude modulation of the FM signal is unavoidable.

Further possibilities of utilization of the invention exist wherever a troublesome phase modulation occasioned by amplitude modulation has to be avoided.

I claim:

1. A multistage transistor amplifier circuit for reducing interference phase modulation of a frequency modulated signal whose amplitude fluctuates in dependence upon the modulation frequency as a result of its passage through frequency-selective members, comprising a multistage cascade transistor amplifier constructed to pass frequency-modulated signals of a narrow pass band comprising a first transistor having emitter, collector and base electrodes, a second transistor having emitter, collector and base electrodes, means for blocking direct current signals connected to said base of said first transistor, the input signal applied between the means for blocking said base and another electrode of said first transistor, a bias voltage connected to said base electrode of the first transistor, a first resistor connected across the input to said first transistor and said means for blocking, a transformer with low stray inductance with its primary connected in the output circuit of said first transistor between the remaining electrode of said transistor and said means for blocking, a second means for blocking connected in series with the primary of said transformer, third means for blocking connected to the base of said second transistor, the secondary of said transformer connected in circuit with an electrode other than the base of said second transistor and said third blocking means, a positive feedback circuit connected between the secondary of said transformer and said another electrode of the first transistor, a second resistor connected across the secondary of said transformer and an inductance connected between the bases of the first and second transistors.

2. A cascade multistage amplifier according to claim 1 wherein said positive feedback circuit comprises a capacitor and resistor connected in series.

3. A multistage transistor amplifier according to claim 1 wherein the secondary winding of said transformer comprises a strip of conductive material, said strip being enclosed at opposite sides by the primary winding and at least one of the sides of said primary winding, which is remote from said secondary winding, being provided with a second strip of conductive material which acts as a field displacer, said second strip being so constructed that no short circuiting ring formation exists.

4. A multistage transistor amplifier according to claim 3 wherein said strip of conductive material is copper and said second strip of conductive material is copper.

5. A multistage transistor amplifier according to claim 3 wherein said strip of conductive material is copper and said second strip of conductive material is aluminum.

References Cited

UNITED STATES PATENTS

| | | | |
|---|---|---|---|
| 2,134,677 | 10/1938 | Vreeland | 330—112 X |
| 3,110,869 | 11/1963 | Smith-Vaniz et al. | 330—21 |

FOREIGN PATENTS

| | | |
|---|---|---|
| 1,173,513 | 10/1958 | France. |

OTHER REFERENCES

Electronic Engineering, pp. 192–195, April 1958, "1 kc./s. Transistor High-Gain Tuned Amplifier," by R. A. Hall, B.Sc.

Electronics, vol. 25, Issue #5, pp. 98–102, May 1952, "Transistorizing Communication Equipment," by Epstein et al.

NATHAN KAUFMAN, Primary Examiner

U.S. Cl. X.R.

330—100